Dec. 6, 1960  D. O. MILLER  2,963,200
FUEL DISTRIBUTING MECHANISM
Filed April 16, 1959  2 Sheets-Sheet 1

Dean O. Miller
INVENTOR.

BY Ramsey and Kolisch
Attys.

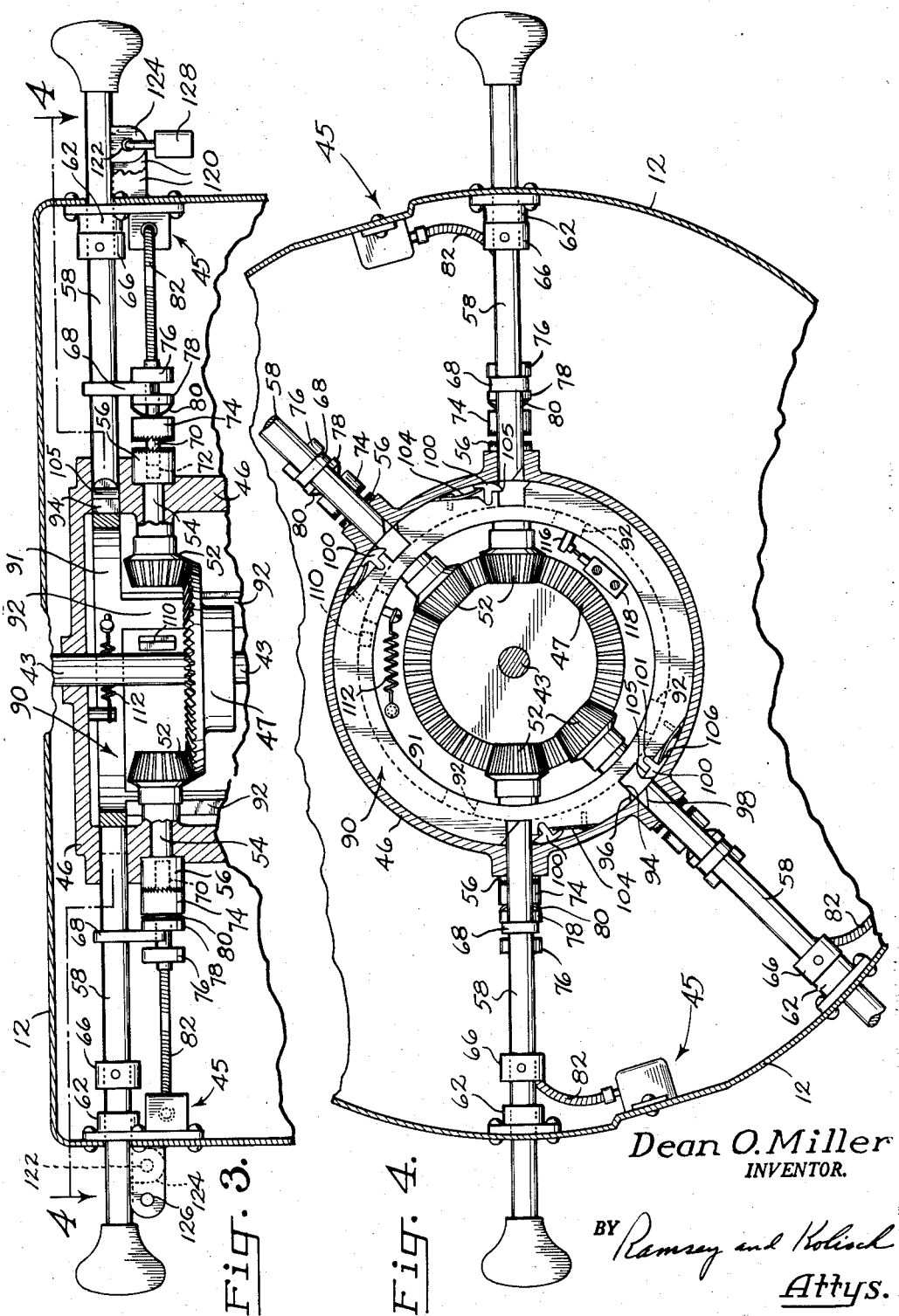

United States Patent Office 2,963,200
Patented Dec. 6, 1960

2,963,200

FUEL DISTRIBUTING MECHANISM

Dean O. Miller, P.O. Box 550, Klamath Falls, Oreg.

Filed Apr. 16, 1959, Ser. No. 806,967

4 Claims. (Cl. 222—26)

This invention relates to fluid distributing mechanism, and more particularly to a distribution mechanism for motor fuel and the like which comprises plural recording devices for recording the volume of fuel distributed, and means for operating specific ones of these devices independently of the others.

Such a fluid distributing mechanism is used advantageously by gasoline and diesel fuel dispensers in the handling of large volume accounts. The mechanism is also useful for individual business concerns to enable the concern to establish accurately the amount of fuel consumed by individual pieces of equipment.

A general object of this invention is to provide an improved fuel distributing mechanism which includes plural recording devices for recording the volume of fuel handled characterized by improved mechanism for placing selected ones of these recording devices into operation.

Another general object of the invention is to provide such mechanism which is simple to operate and thus needs no special operator to manipulate it, and thus is ideally suited for operations where it is intended that equipment handlers themselves run the mechanism when receiving fuel therefrom.

In an embodiment of the invention there is provided an upright housing equipped with a delivery hose for delivering fuel. Within the housing there is mounted a pump, motor means for driving the pump, and conduit means connected to the discharge of the pump which forms a continuation of the delivery hose just mentioned. Positioned and arranged to be responsive to the volume of fluid pumped through this conduit means and the delivery hose is a flow metering means.

Mounted so as to be observable from outside the housing are the dial portions of a series of recording devices of the type adapted to record liquid volumes. These are driven by the flow metering means, and are connected to the latter means by selectively actuated means that enable selected ones of the recording devices to be placed in operation. Thus within the housing there is one or more main drive gears driven by the flow metering means, and plural driven gears meshing with these drive gears, one for a recording device. Associated with each of these driven gears is a selectively operable clutch mechanism, operable on actuation to establish a drive connection for a particular recording device. These recording devices are referred to herein as "subrecorders" or "subrecording devices," and are used to record subtotals of liquid volumes pumped. A master recording device is also provided, which is always driven by the flow metering means, such master recording device indicating the total volume of fluid pumped by the unit.

A feature of the invention is the provision of a series of selector members, specifically a series of handles or levers, which project outwardly of the housing and which are used to actuate the various clutch mechanisms for the subrecording devices. A novel lockout means is included which prevents actuation of further levers after actuation of any one. This is important, since the arrangement prevents a user inadvertently from running up a total on more than one of the selectively connected subrecorders, the operation of these recorders being selective only.

An additional feature of the invention is the provision of a switch means for starting the pump motor that is actuated by actuation of any of the levers just described. In order to prevent the dispensing of fuel when none of the subrecording devices are placed in operation, provision is made for this switch means to be actuated on actuation of any selector handle only after the clutch associated with the handle becomes engaged.

In an embodiment of the invention, the delivery hose outside the housing is provided with a valve controlled nozzle, and this valve is opened to produce discharge of fuel from the distributing mechanism. The pump pumping the fuel is started prior to actuation of the nozzle valve, and a valve-controlled bypass conduit connects the inlet and discharge sides of the pumps, thus to permit circulation of fluid prior to opening of the nozzle valve.

Thus other objects of the invention are the provision of novel clutch controlled mechanism for placing selected subrecorders in operation, the provision of novel lockout means for preventing the operation of remaining subrecorders after any one of them has been placed in operation, and the provision of novel means insuring starting of the pump motor only after a selected subrecorder has been placed in operation.

These and other objects and advantages are attained by the invention, which is described hereinbelow in conjunction with the accompanying drawings, wherein:

Fig. 3 is a section view along the line 3—3 in Fig. 2, slightly enlarged;

Fig. 4 is a view along the line 4—4 in Fig. 3;

Figure 2:
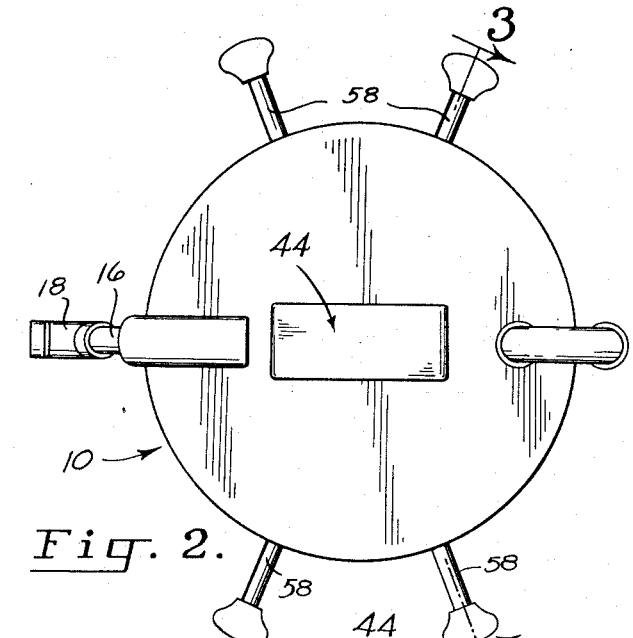
Fig. 2 is a top view of the pumping stand illustrated in Fig. 1.
Figure 1:
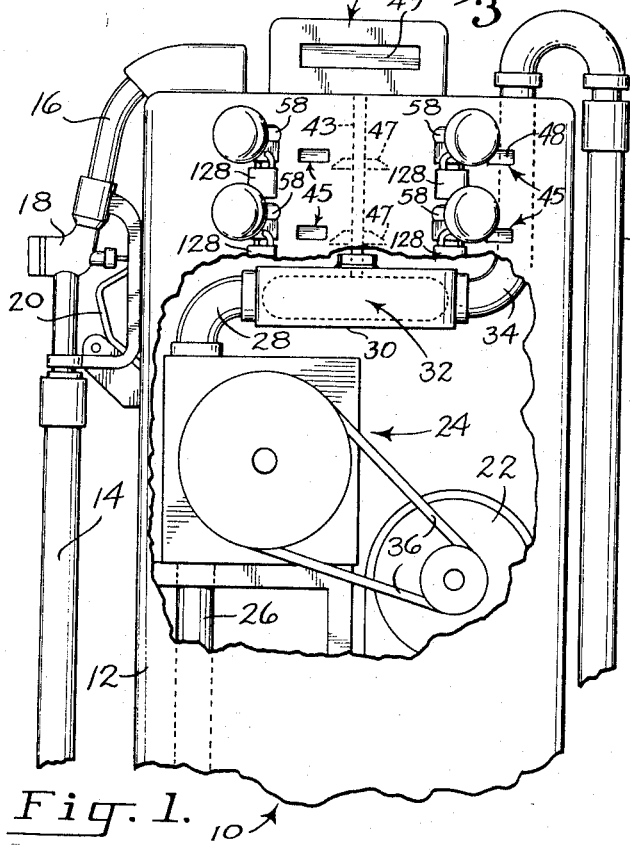
Fig. 1 is a side view of upper portions of a distributing stand incorporating the fuel distributing mechanism of the invention and illustrating an embodiment of the invention.

Referring now to the drawings wherein a specific embodiment of the invention is illustrated, and more particularly to Figs. 1 and 2, 10 indicates a pumping stand generally, such as might be provided at the usual filling or service station. The pumping stand comprises a substantially cylindrical and upright housing portion 12, which is suitably supported on the ground. Extending out of the housing is a delivery hose or distributing line for the stand, indicated at 14. An intermediate portion of the delivery hose is broken away in Fig. 1, but it should be understood that the portions shown at the right and the left of the stand in Fig. 1 are joined.

The delivery hose 14 terminates in a valve controlled nozzle portion 16, of the type that is designed to be inserted into the inlet pipe of a motor vehicle fuel tank. The valve for the nozzle portion is indicated at 18, and includes a handle 20 for controlling the valve. By properly manipulating handle 20, the rate of delivery of fuel is controlled. Valve 18 closes completely on release of handle 20 to shut off the flow of fuel from the nozzle.

Mounted within housing 12 is an electric motor indicated at 22. This motor drives a pump unit indicated at 24. The intake for the pump unit is at the base of the pump unit, and is connected by piping 26 to the usual fuel tank. At the discharge side of the pump unit there is provided a conduit section 28, and this communicates with the housing 30 of a fluid flow metering device 32. The interior of housing 30 of the metering device is connected by a conduit section 34 with the delivery hose 14 held outside of the housing portion 12. Thus conduit section 28, the housing 30, conduit section 34 and delivery hose 14 constitute a distributing conduit means at the discharge side of the pump unit in the invention.

Figure 5:
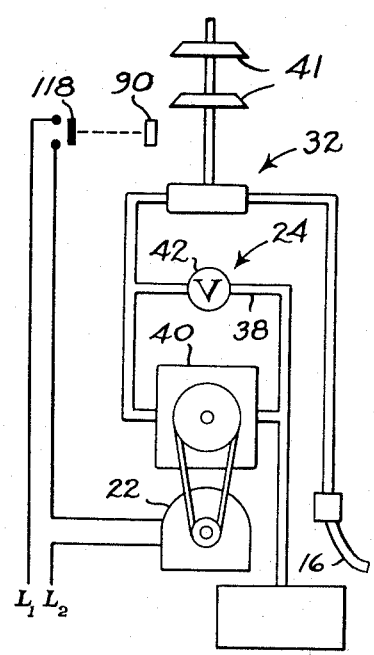
Fig. 5 is a schematic view showing the hydraulic circuit and electric control circuit used in the invention.

Electric motor 22 is drivingly connected to the pump unit 24 by drive belt 36. As will become hereinafter apparent, during operation the motor is started so as to drive the pump and produce fluid pressure within the distributing conduit means mentioned. Fuel is not discharged from the conduit means, however, until valve 18 of the nozzle is actuated. A by-pass is included in pump unit 24 to enable circulation of fuel under the urging of the pump unit when valve 18 is closed. Thus, as best seen in Fig. 5, pump unit 24 includes a by-pass 38 that connects the intake and discharge sides of a pump 40 of pump unit 24. The flow of fuel in by-pass 38 is controlled by a pressure responsive relief valve 42.

Fluid flow metering device 32 is of conventional design, and includes a rotor member within the housing which rotates at a speed corresponding to the flow of fuel through the housing. The rotor member drives a shaft 43 projecting upwardly from the metering device, shaft 43 constituting a metering means responsive to the flow of fuel in the distributing conduit means.

Shaft 43 provides the power for operating the various recording devices present in the construction. In the embodiment illustrated, one master recording device 44 is shown, and a series of subrecording devices 45. The subrecording devices are arranged at two levels. Only one of the levels is illustrated with particularity in Figs. 3 and 4, since the two levels are similar in construction and operation.

Shaft 43 is rotatably journalled in the upper end wall of a cylindrical mounting frame 46, the latter frame being mounted in a suitable manner in fixed position within the housing. Affixed to shaft 43 at approximately the level of each level of subrecorders is a bevel gear 47. This bevel gear constitutes a drive gear in the mechanism.

It will be noted that in the form of the invention shown four subrecording devices are provided at each level. Each of these, as well as the master recorder 44, is conventional in construction and includes dial wheels that are rotated by suitable mechanism and that indicate by their positions volume of fuel discharged. The dials of the various subrecorder devices are viewable through window portions 48 provided in housing 12 (see Fig. 1). The dials of master recorder 44 are viewable through window 49.

Master recorder 44 is driven continuously by shaft 43, which is directly connected to the master recorder. The subrecorders are selectively placed in operation. Thus the master recorder records total volume pumped, whereas the other recorders are used to indicate partial volumes pumped.

Specifically (now referring to Figs. 3 and 4), for each subrecording device there is provided a gear 52 which meshes with bevel gear 47. This is affixed to a stub shaft 54 rotatably journaled in frame 46. Affixed to the end of stub shaft 54 away from gear 52 is a clutch part 56 (which may be provided with teeth as shown for more positive drive when the clutch is engaged).

Directly above each stub shaft 54 and aligned therewith and projecting radially outwardly from frame 46 is a push-pull lever or selector 58. This has its inner end mounted for reciprocation in frame 46, and its other end slidably mounted in a mounting 62 secured to the housing 12. A collar 66 prevents the complete withdrawal of the push-pull lever from frame 46 and housing 12.

Secured to an intermediate portion of lever 58 is a depending shift arm 68. The push-pull lever is prevented from rotating by means to be described and thus arm 68 is always maintained in a downwardly depending position. Arm 68 has a bifurcated end which fits over the end of a short clutch shaft indicated at 70. The other end of clutch shaft 70 is centered in clutch part 56 by a bore 72. The clutch shaft has secured thereto a clutch part 74 which is provided to engage clutch part 56. Shaft 70 slidably reciprocates in bore 72 during engagement and disengagement of parts 56, 74, which constitutes a clutch mechanism.

Clutch shaft 70 has secured to its outer end and outwardly of arm 68 a collar 76. Intermediate collar portion 76 and clutch part 74 is a washer 78 which is slidable on the clutch shaft, and a bent spring washer 80. Spring washer 80 tends to urge washer 78 toward collar portion 76.

A cable or power transmitting means 82 is secured at one end of clutch shaft 70. The other end of cable 82 is connected to the operating mechanism of a subrecording device. When a clutch part 74 is rotated by engagement with a clutch part 56 and rotation of gear 47, cable 82 produces actuation of a subrecording device and movement of the dials therein. Drive is established from gear 47 to a subrecording device by pushing in a push-pull handle 58 until a pair of complementing clutch parts 56, 76 meet with each other. The lost motion provided by spring washer 80 enables engagement of complementing clutch parts and a positive drive connection prior to pushing handle 58 to its fullest extent inwardly.

Rotatably mounted on the inside of cylindrical mounting frame 46 is an annulus 90 comprising as many ring members 91 as there are levels of subrecorders. Each ring member 91 fits within an annular groove formed on the inside of cylindrical frame 46. The ring members for the various levels of subrecorders are interconnected as by bar portions 92, and in this way all the ring members rotate as a unit.

Each ring member has a series of recesses 94 provided therein, one being provided to receive the end of each push-pull lever carried at the level of the ring member. Each recess has a sloping side portion 96 which is adapted to slide against the sloping side 98 at the inner end of a push-pull lever. Each ring member also has, for each push-pull lever carried at the level of the ring member, a catch 100 having an anchor end portion 101 rockably mounted in a suitably formed cavity. This catch is biased by a leaf spring 104 to rock in a clockwise direction in Fig. 4 until an end 106 of the catch strikes the inner wall of the groove mounting the ring on cylindrical frame 46, and another end 105 moves forwardly into a recess portion 94.

Figure 6:
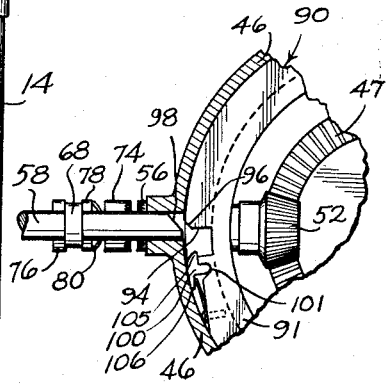
Fig. 6 is a view showing portions of the construction shown in Fig. 4, but showing the parts in a different position.

Annulus 90, in a rest position, occupies the position shown in Fig. 6 relative to frame 46, with the recesses 94 shifted slightly to one side of the ends of the push-pull levers, and sloping portions 96 disposed in front of the ends of the push-pull levers. The rest position is defined for the annulus by a stop 110 (see Fig. 3) which is secured to the inside of frame 46 in position to strike one of the bars 92. A coil spring 112 (see Fig. 4) provides the bias for urging the annulus to its rest position. The annulus can be rotated in a clockwise direction in Figs. 4 and 6 away from this rest position with tensioning of the coil spring.

Also a part of the annulus 90 is an actuating arm 116 (see Fig. 4). This is positioned and arranged so as to contact the switch finger of a switch 118 mounted on the inside of cylindrical frame 46. The switch is open when the annulus is in the position of Fig. 6, but closed when the annulus is shifted to the position of Fig. 4. Switch 118 closes the circuit for electric motor 22, and is used to start the pump, as best illustrated by Fig. 5.

On the upper side of the cover corner pieces 10 may each push-pull lever 58 a pair of spaced-apart ears 120, lying in a vertical plane. Affixed to each push-pull lever is a depending ear 124 which extends downwardly in the space between ears 120. Ears 120 snugly slide against opposite faces of ear 124, and keep the push-pull lever from rotating. They also are used for locking a lever in a retracted position. Thus each ear 124 has a bore 122 formed therein which is movable into registry with bores 126 provided in ears 120 when the lever is retracted. These registering bores accommodate the shackle portion of a padlock 128, used in locking the lever in place.

The operation of the mechanism is now explained. When the distributing mechanism is not in use, the push-pull levers are all pulled to their extended position, as illustrated by the right hand lever 58 in Fig. 4 and the lever 58 shown in Fig. 6. These levers in this position may be locked through the use of padlocks 128. In this position, clutch parts 56, 76 of each subrecording device are out of engagement. Further, the inner ends of the push-pull levers are pulled out of recesses 94, which enables coil spring 112 to maintain the annulus in its rest position, determined by a bar 92 striking abutment or stop 110. Ends 105 of leaf springs 104 urge all the catches 100 to positions wherein ends 106 engage the inner wall of the mounting groove. The catches, however, are to one side of the inner ends of the push-pull levers, so that they do not prevent the insertion of these ends.

When a push-pull lever is then unlocked and pushed inwardly, the sloping side of the inner end of the lever slides against a portion 96, thus to produce a wedging action and shifting of the annulus from the position of Fig. 6 (its unlocking position) to the position shown in Fig. 4 (its locking position). Prior to this movement of the annulus, however, clutch parts 56, 76 move into engagement (with the spring washer accommodating movement of the lever end after engagement of the clutch parts). Thus a drive connection for a subrecorder is established before appreciable movement of the annulus. The end of each lever constitutes a means connected to each clutch for producing rotation of annulus 90.

On shifting of the annulus 90, switch 118 closes to start motor 22 and pump 40. Fluid pressure builds up in the delivery conduit, and by-pass 38 permits fluid circulation.

When the annulus moves to the position of Fig. 4, the catch 100 associated with the lever which has been pushed inwardly swings aside thus to enable a recess 94 to receive the end of the lever. The other catches, however, remain in their original position, and their ends 105 move out in front of the inner ends of the remaining levers. These ends then prevent movement of any of the remaining push-pull levers inwardly, so long as the first mentioned lever remains depressed. The annulus, therefore, constitutes a lockout means preventing actuation of remaining push-pull levers, if one of them is actuated.

With the one lever depressed and one subrecorder placed in operation, when the nozzle valve 18 is opened, fuel flows through line 14 while accompanied by rotation of shaft 43. This produces appropriate adjustment of the master recorder 44, which is always driven by shaft 43, as well as adjustment of the subrecorder selected for operation.

While there has been described an embodiment of the invention, it is appreciated that changes may be made in the parts and in their arrangement. It is desired not to be limited to the specific embodiment described, but to cover all modifications and variations which would be apparent to one skilled in the art and that come within the scope of the appended claims.

It is claimed and desired to secure by Letters Patent:

1. Fuel distributing mechanism comprising a pump for pumping fuel, electric motor means for driving the pump, distributing conduit means including a delivery hose connected to the discharge of the pump for delivering fuel pumped, flow metering means responsive to the flow of fuel through said distributing conduit means, a series of recording devices for recording volumes of fuel pumped, said series comprising a master recorder and plural subrecorders, means for each subrecorder including a manually operated selector means for connecting selectively the subrecorder to said flow metering means for actuation of the subrecorder by said flow metering means, drive means connecting said master recorder to said flow metering means for actuation of the master recorder simultaneously with actuation of any of said subrecorders, switch means for starting said electric motor means, and means operatively interconnecting said switch means and each of said selector means whereby actuation of any of said selector means actuates said switch means thus to start said motor means.

2. Fuel distributing mechanism comprising a pump, an electric motor for driving the pump, distributing conduit means connected to the discharge of the pump for delivering fuel pumped, flow metering means responsive to the flow of fuel through said distributing conduit means, a series of recorder devices for recording volumes of fuel pumped, said series comprising a master recorder and plural subrecorders, means for each subrecorder including a manually operated selector means and a clutch connected thereto to be actuated by the selector means for connecting selectively the subrecorder to said flow metering means for actuation of the subrecorder by said flow metering means, drive means connecting the master recorder to said flow metering means for actuating of the master recorder simultaneously with actuation of any of said subrecorders, switch means for said electric motor for starting and stopping the same, means interconnecting said switch means and each of said selector means whereby actuation of any of selector means actuates said switch means, each of said selector means being movable in one direction to start said motor and in an opposite direction to stop said motor, the means interconnecting the selector means and the switch means being constructed and arranged so that movement of a selector means in said one direction is operable sequentially first to actuate the clutch of the selector means and then to cause actuation of said switch means.

3. In fuel distributing mechanism the combination of a housing, fuel distributing conduit means partially within the housing and having a delivery hose held externally of the housing, a pump and motor therefor within the housing for pumping fuel through the distributing conduit means, a drive gear mounted within the housing and means rotating the gear responsive to the flow of fuel through said distributing conduit means, plural recording devices for recording the volume of fuel passing through said distributing conduit means, drive means for each of the recording devices, said drive means including a driven gear driven by said drive gear and clutch means for making and breaking a drive connection between the driven gear and the recording device, selector means for each clutch means for actuating the clutch means, a member mounted for rotation in said housing, each selector means having means for rotating said member in one direction when the selector means is actuated in a direction to produce a drive connection by a clutch means, switch means actuated by rotation of said member in said one direction to cause starting of the pump motor, said switch means and the various clutch means being constructed and arranged so that said switch means is actuated only after the establishment of a drive connection through any of said clutch means.

4. Fuel distributing mechanism comprising a frame, distributing conduit means supported by the frame and means for producing a flow of fuel through the same comprising a pump and a motor for the pump, flow metering means mounted on the frame responsive to the flow of fuel through said distributing conduit means, a drive gear and means connecting the drive gear to said flow metering means whereby the former is driven by the latter, plural recording devices, drive means for each of these recording devices including manually operated clutch means for establishing selectively a drive connection between the recording device and said drive gear, a lockout member mounted for movement between a locking and an unlocking position, means operatively connecting each clutch means to the lockout member whereby the clutch means produces movement of the lockout member toward its locking position on actuation of the clutch means, mechanism included on the lockout member constructed to prevent actuation of the clutch means of remaining recording devices on actuation of the clutch means of any one of the recording devices, and switch means for said motor actuated to start the motor on movement of the lockout member toward its locking position.

References Cited in the file of this patent

UNITED STATES PATENTS

| | | |
|---|---|---|
| 1,890,078 | Enochs et al. | Dec. 6, 1932 |
| 2,542,219 | Trexler | Feb. 20, 1951 |
| 2,712,885 | Winship | July 12, 1955 |
| 2,838,237 | Spaunburg et al. | June 10, 1958 |
| 2,840,272 | Blackburn et al. | June 24, 1958 |